United States Patent
Iida et al.

(10) Patent No.: US 6,805,531 B2
(45) Date of Patent: Oct. 19, 2004

(54) SET OF SPLIT BODIES FOR FORMING BLOWER FAN THROUGH HOLLOW-ARTICLE INJECTION MOLDING PROCESS

(75) Inventors: Giichi Iida, Tokyo (JP); Fumio Takase, Takaoka (JP); Zenzo Hashizume, Takaoka (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 10/359,653

(22) Filed: Feb. 7, 2003

(65) Prior Publication Data

US 2003/0152458 A1 Aug. 14, 2003

(30) Foreign Application Priority Data

Feb. 8, 2002 (JP) ..................................... 2002-032065

(51) Int. Cl.[7] .................................................. F01D 1/02
(52) U.S. Cl. .................. 415/206; 415/170 R; 415/915; 416/185
(58) Field of Search .............................. 415/206, 170 R, 415/107 A, 219 C, 196, 88, 915; 416/185–188, 241 A, 200, 229 R; 164/94; 264/263, 249–259

(56) References Cited

U.S. PATENT DOCUMENTS

| | | | | |
|---|---|---|---|---|
| 2,902,941 A | * | 9/1959 | Yoneo | 416/186 R |
| 3,265,001 A | * | 8/1966 | Deters | 415/68 |
| 3,541,607 A | * | 11/1970 | Greene | 415/112 |
| 4,556,364 A | * | 12/1985 | Barker | 415/172.1 |
| 5,538,395 A | * | 7/1996 | Hager | 416/144 |
| 5,558,499 A | * | 9/1996 | Kobayashi | 416/186 R |
| 5,573,374 A | * | 11/1996 | Giberson | 416/186 R |
| 6,042,364 A | | 3/2000 | Nishida | |
| 6,146,094 A | * | 11/2000 | Obana et al. | 415/200 |

FOREIGN PATENT DOCUMENTS

DE   197 01 297 A1   7/1998

* cited by examiner

*Primary Examiner*—Edward K. Look
*Assistant Examiner*—James M. McAleenan
(74) *Attorney, Agent, or Firm*—Nixon Peabody, LLP; Donald R. Studebaker

(57) ABSTRACT

A set of split bodies for forming a synthetic-resin blower fan through a hollow-article injection molding process, wherein the blower fan integrally includes a circular base, a cover portion having an air inlet opening at the center thereof, and a plurality of blades. The set of split bodies comprise a first split body including the circular base and a plurality of blade members, and a second split body defining the inner surface of the cover portion and having an outer surface on the opposite side of the first split body. The outer surface of the second split body is formed with a plurality of reservoirs each extending radially in alignment with the corresponding blade member of the first split body to define spaces to be filled with molten synthetic resin in a state where the first and second split bodies are assembled together.

6 Claims, 7 Drawing Sheets

SET OF SPLIT BODIES FOR FORMING BLOWER FAN THROUGH HOLLOW-ARTICLE INJECTION MOLDING PROCESS

FIELD OF THE INVENTION

The present invention relates to a set of split bodies for forming a synthetic resin blower fan through a so-called hollow-article injection molding process, and more specifically to a set of split bodies for forming a synthetic resin blower fan including a plurality of radial airflow passages formed between a circular base and a doughnut-shaped cover portion having an air inlet opening, through the hollow-article injection molding process.

BACKGROUND OF THE INVENTION

Heretofore, blowers for generating airflow have been used in various operating machines such as power blowers and sprayers. Each of the blowers includes a blower fan rotatably driven by any suitable drive unit such as an air-cooled two-cycle internal combustion engine. Regardless of the type of blowers, the blower fan has a similar structure which integrally includes a circular base, a doughnut-shaped cover portion having an air inlet opening at the center thereof, and a plurality of blades each extending radially between the circular base and the inner surface of the cover portion to define a plurality of radial airflow passages between the adjacent blades.

Typically, in the conventional blower fun, the inner surface of the cover portion is screwed or riveted integrally to a boss formed in each of the blades by partially increasing the thickness thereof.

The blast performance of the blower fan has a significant dependence on the configuration of the airflow passages defined by the blades. In the conventional method, it is required to form the bosses in the blades, which imposes restrictions in design. The subsequently required operation such as screwing causes increased labor and time in manufacturing processes.

On the other hand, there has been known a hollow-article injection molding process disclosed, for example, in "Nikkei Mechanical" (Vol. 12, May/2000, pp 122–127), Japanese Patent Publication No. 2-38377, and Japanese Patent Laid-Open Publication No. 11-138584. The hollow-article injection molding process disclosed in these publications can be summarized as follows. Primarily, a pair of split bodies to be jointed together are molded separately by using a set of dies with molten synthetic resin. Secondary, the dies are moved without releasing the split bodies therefrom to butt the split bodies together, and molten synthetic resin is injected into a space formed in the periphery of the butted portion of the split bodies which are still at high temperature. Thus, the periphery of the butted portion of the split bodies are fused by the heat of the injected molten synthetic resin, and thereby the spilt bodied will be fusedly jointed together through the injected molten synthetic resin itself. The term "hollow-article injection molding process" herein means the above method.

Generally, the hollow-article injection molding process includes two processes: a DSI (Die Slide Injection) molding process and a DRI (Die Rotating Injection) molding process. In the DSI molding process, After forming a pair of split bodies as primary molded components, a set of dies are opened while leaving the split bodies therein, and the respective dies are slid (linearly moved) to butt the split bodies together. Then, the split bodies are fusedly jointed together through a secondary injection molding. In the DRI molding process, a set of dies are rotated while leaving therein a pair of split bodies as primary molded components to butt the split bodies together, and molten synthetic resin is injected into a space formed between the butted surfaces of the split bodies to fusedly joint the split bodies together. The term "hollow-article injection molding process" herein means the aforementioned method independently of the movement direction of the molting dies.

SUMMARY OF THE INVENTION

It is an object of the present invention to provide a set of split bodies for allowing an integral blower fan to be reliably formed without difficulty through the hollow-article injection molding process.

In order to achieve the above object, the present invention provides a set of split bodies for forming a synthetic-resin blower fan through a hollow-article injection molding process, wherein the blower fan includes a circular base, a doughnut-shaped cover portion having an air inlet opening at the center thereof, and a plurality of blades each extending radially between the circular base and the inner surface of the cover portion to define a plurality of radial airflow passages between the adjacent blades. The set of split bodies comprises a first split body including the circular base and a plurality of blade members serving as respective substantial parts of the blades, and a second split body defining the inner surface of the cover portion and having an outer surface on the opposite side of the first split body. The outer surface of the second split body is formed with a plurality of reservoirs each extending radially in alignment with the corresponding blade member of the first split body to define spaces to be filled with molten synthetic resin in a state where the first and second split bodies are assembled together. Further, each of the reservoirs having a bottom wall formed with a through hole adapted to allow an upper portion of the blade member to be inserted therethrough and tightly fitted therein so that the terminal end of the blade member is exposed into the corresponding reservoir in the assembled position.

The set of split bodies according to the present invention is formed and jointed in the following process. After appropriately preparing a set of dies for defining therebetween first and second cavities, the first and second split bodies are primarily molded by injecting molten synthetic resin into the first and second cavities, respectively.

After the primary injection molding, one of the dies is moved while leaving the first and second spilt bodies separately in the opposite dies. At this moment, the second split body is left in the second cavity for forming the upper surface thereof. Then, the dies are relatively moved to allow the blade members of the first split body and the corresponding through holes of the second split body to be opposedly aligned with one another, and then the respective upper portions of the blade members are inserted into the corresponding through holes. Thus, each of the through holes is closed by the upper portion of the blade member. In this position, the respective terminal ends of the blade members are exposed into the corresponding reservoirs.

The surface of the second cavity receiving the second split body therein may be configured to close the respective reservoirs on the opposite side of the through holes closed by the upper portions of the blade members so as to define a flow channel for allowing molten synthetic resin to flow therein. That is, in the present invention, the flow channel is defined by closing the reservoirs by use of the surface of the die.

One of the dies for leaving the second split body therein is appropriately provided with an injection port opened to the reservoirs or the flow channel to inject the molten synthetic resin therethrough, and a gas-vent hole opened to atmosphere.

In the above position, molten synthetic resin is injected from the injection port. The molten synthetic resin flows in the reservoirs or the flow channel to push out air in the channels to atmosphere through the gas-vent hole formed in the die. In each of the reservoirs, the molten synthetic resin contacts the inner wall of the reservoir and the terminal end of the blade member, and thereby the surfaces of the inner wall and the terminal end are appropriately fused by the heat of the molten synthetic resin. Gas caused by the fusion of the synthetic resin of the split bodies is also discharged from the gas-vent hole to atmosphere. When the revivers or the flow channel is fully filled with the injected molten synthetic resin, the injection operation is completed. Then, the finished blower fan is released from the dies. An operator can determined if the reservoirs are fully filled with the synthetic resin, only by visually checking the outer surface of the blower fan.

The set of split bodies according to the present invention allows the blower fan to be integrally formed through the injection molding process, which provides simplified manufacturing processes. In addition, the respective upper portions of the blade members are fusedly jointed to the second split body through the hollow-article injection molding process. This eliminates the need for providing the bosses used in fixing the doughnut-shaped cover portion (side plate) to effectively remove the restrictions in the design of the airflow passages. Thus, the structure of the blower fan can be flexibly designed in terms of its performance.

Further, the surface of the die is used to close the opened reservoirs and form the closed flow channel for receiving or guiding the injected molten synthetic resin. This eliminates the need for forming a wall for closing the flow channel, in the second split body having a restriction on its thickness, and provides increased volume of the flow channel. Thus, the injected molten synthetic resin can be sufficiently injected without its sharp temperature drop, and thereby the walls in the flow channel can be reliably fused as much as required to provide enhanced connection strength.

In a specific embodiment of the present invention, the upper portion of the blade member may be provided with a protrusion adapted to extend into the reservoir with a certain gap formed between the outer peripheral surface of the protrusion and the inner peripheral surface of the reservoir in the assembled position.

Further, the bottom wall may have a raised portion extending from the inner surface toward the blade member so as to allow to increase the depth of the reservoir to increase the height of the protrusion to be adapted into the reservoir in the assembled position.

In another embodiment of the present invention, the upper portion of the blade member may include a step portion around the lower end thereof. The step portion extends in the thickness direction of the blade member. Further, the step portion is adapted to contact a part of the inner surface of the second split body surrounding the through hole in the assembled position.

DESCRIPTION OF THE PREFERRED EMBODIMENT

With reference to the accompanying drawings, a set of split bodies for forming a blower fan through a hollow-article injection molding process according to one embodiment of the present invention will now be described.

The set of split bodies 3, 4 according to this embodiment is used in forming a blower fan 2 of a blower for various operating machines such as sprayers for spraying herbicides, fertilizer or the like, and power blowers for blowing away dead leaves or the like. Generally, the blower fan 2 integrally including a circular base 6, a doughnut-shaped cover portion having an air inlet opening 5 at the center thereof, and a plurality of blades each extending radially between the circular base 6 and the inner surface of the cover portion to define a plurality of radial airflow passages P between the adjacent blades.

Figure 1:
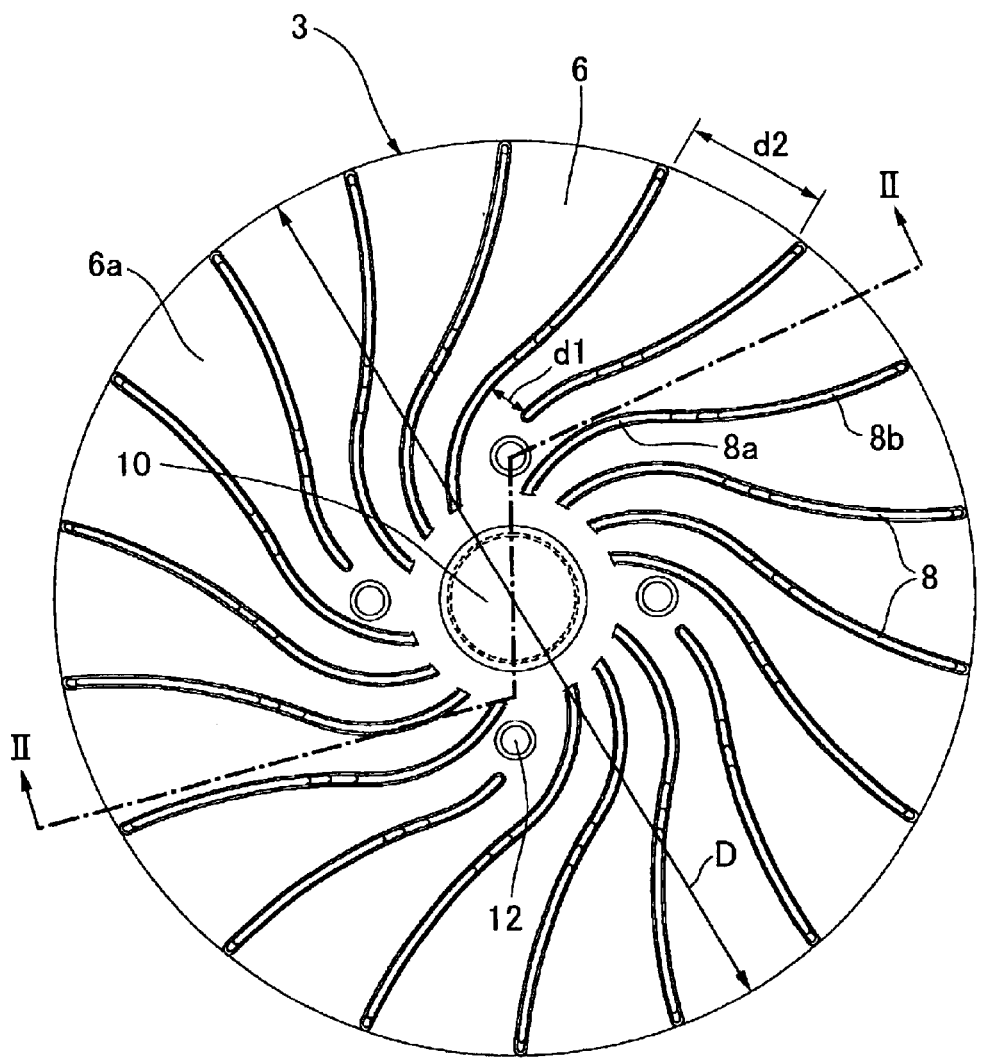
FIG. 1 is a front view of a first split body constituting a blower fan, according to one embodiment of the present invention.

FIG. 1 is a front view of a first split body constituting a blower fan, according to this embodiment.

The construction of first split body 3 will be described with reference to FIG. 1. The first split body 3 includes the circular base 6 located on the side of a driving unit (not shown) for rotatably driving the blower fan 2 and a plurality of blade members 8 serving as respective substantial parts of the blades when the first split body 3 is incorporated in the blower fan 2. The circular base 6 and blade members 8 are made of synthetic resin and formed integrally. A hub 10 is formed at the center of the circular base 6, and a plurality of attachment holes 12 for attaching the circular base 6 to the driving unit with screws are formed around the hub 10. As seen in FIG. 1, each of the blade members 8 extends radially on the upper surface 6a of the circular base 6.

Figure 2:
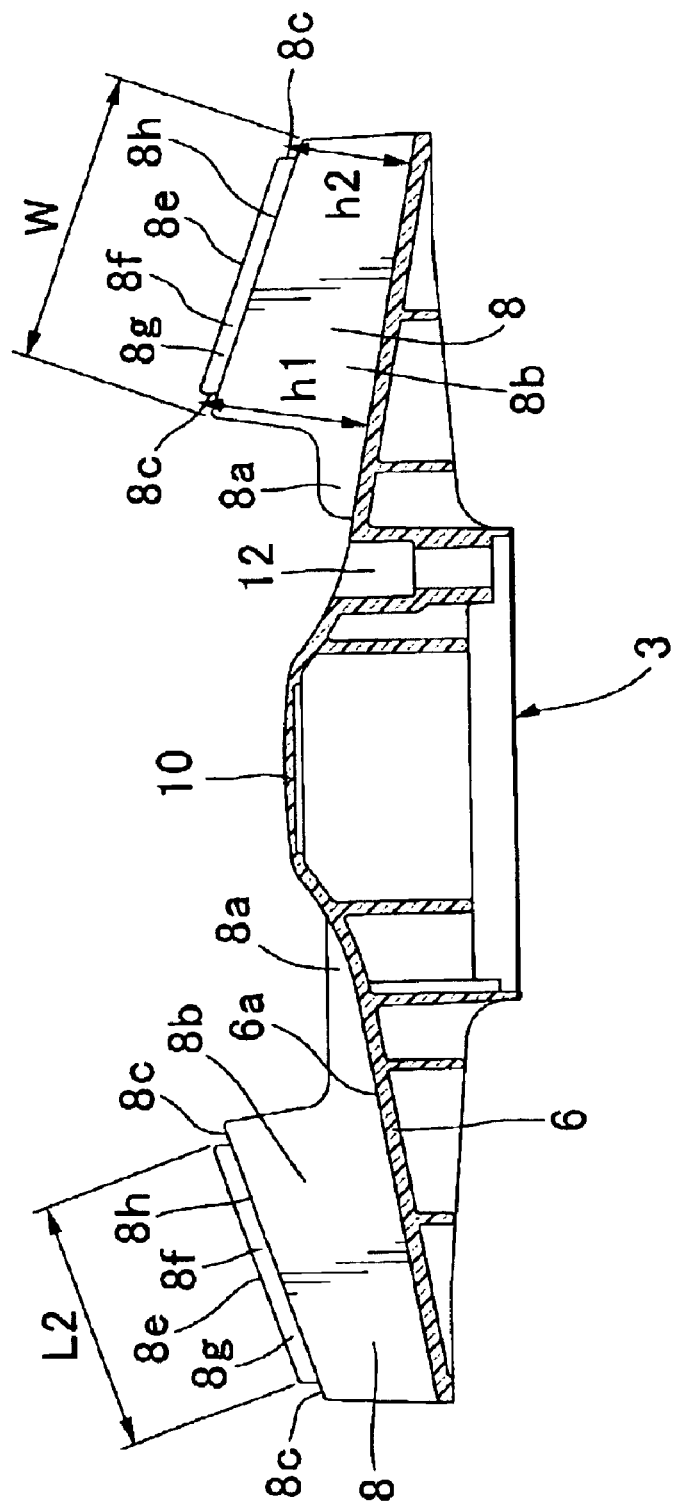
FIG. 2 is a sectional view of the first split body taken along the line II—II in FIG. 1.

FIG. 2 is a sectional view of the first split body 3 taken along the line II–II in FIG. 1.

As seen in FIG. 2, the upper surface 6a of the circular base 6 slants obliquely downward and extend from the hub 10 in the radially outward direction. Each of the blade members 8 has an airflow-deflecting portion 8a having a relatively low height and a passage-forming portion 8b having relatively high height. Each of the airflow-deflecting portions 8a is located radially inward or adjacent to the hub 10, and each of the passage-forming portions 8b extends continuously from the airflow-deflecting portion 8a radially outward. As described in detail later, in a state where the first split body and a second split body 4 serving as a substantial part of the cover portion (side plate) are assembled together, the direction of air introduced from the air inlet opening 5 formed at the center of the second split body is deflected radially outward by the respective airflow-deflecting portions 8a. Further, the radially extending airflow passages P are defined by the inner surface 4a of the second split body 4 and the adjacent passage-forming portions 8b of the blade members 8. The second split body 4 has a doughnut shape, and a width W equal to the length of the passage-forming portion of the blade member 8b, and fully covers the passage-forming portions 8b to form the airflow passages P in the assembled position.

In each of the airflow passages P, the area of its inlet located radially outward should be smaller than that of its inlet adjacent to the air inlet opening 5 to increase the speed of airflow passing therethrough. As seen in FIG. 1, each of the passage-forming portions 8b extends in the radially outward direction of the circular base 6, and the adjacent passage-forming portions 8b are spaced apart from one another with a longer distance d2 on the radially outward side than a distance d1 on the radially inward side. As shown in FIG. 2, in each of the blade members 8, the upper edge of the passage-forming portion 8b slants toward radially outward at an angle larger than the slant angle of the upper surface of the circular base 6 to reduce the height of the passage-forming portion 8b from h1 to h2 toward radially outward. Thus, in the assembled position where the first and second split bodies 3, 4 are assembled together, the area of the outlet becomes smaller than that of the inlet.

Figure 3:
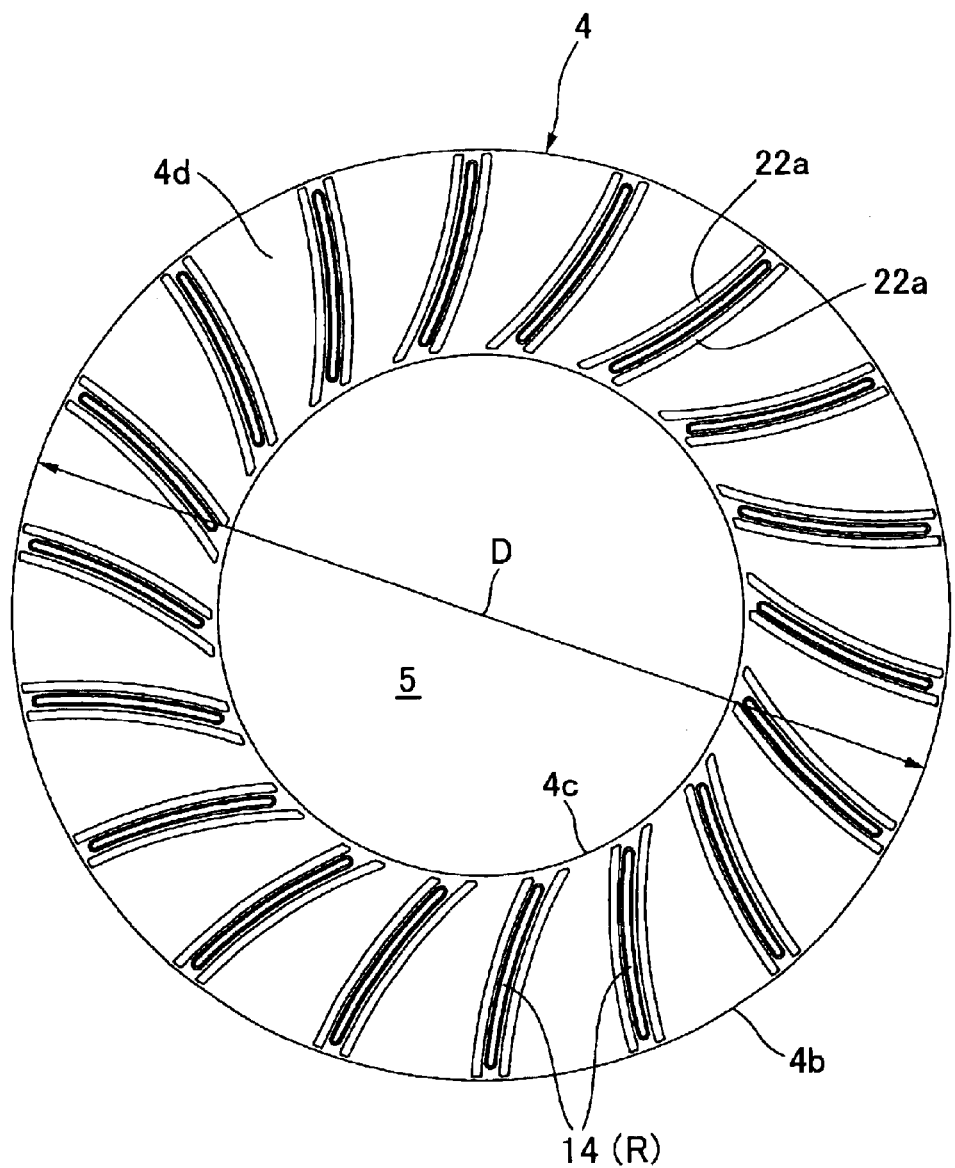
FIG. 3 is a front view of a second split body constituting a blower fan, according to the embodiment.
Figure 4:
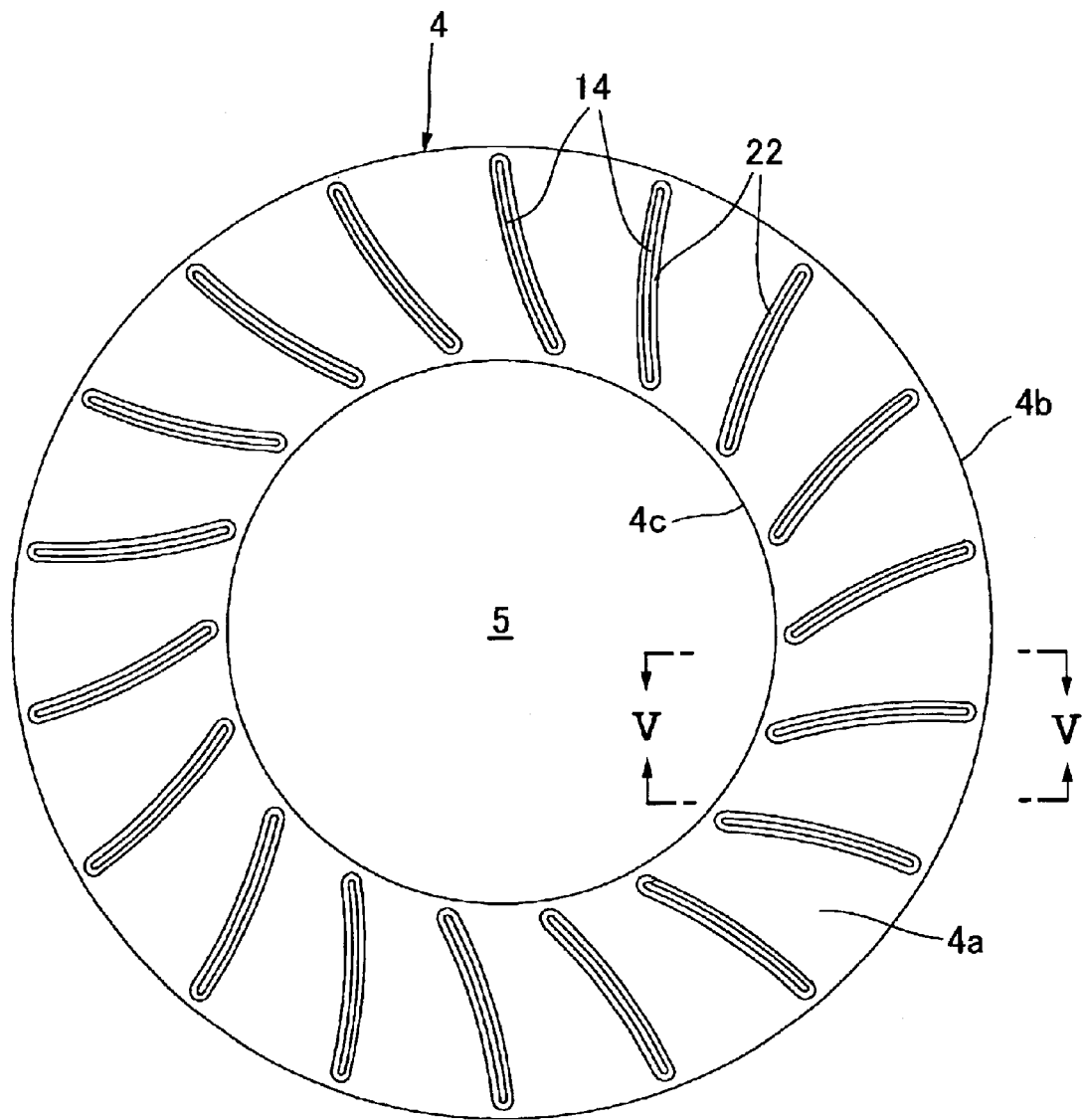
FIG. 4 is a rear view of the second split body.
Figure 5:
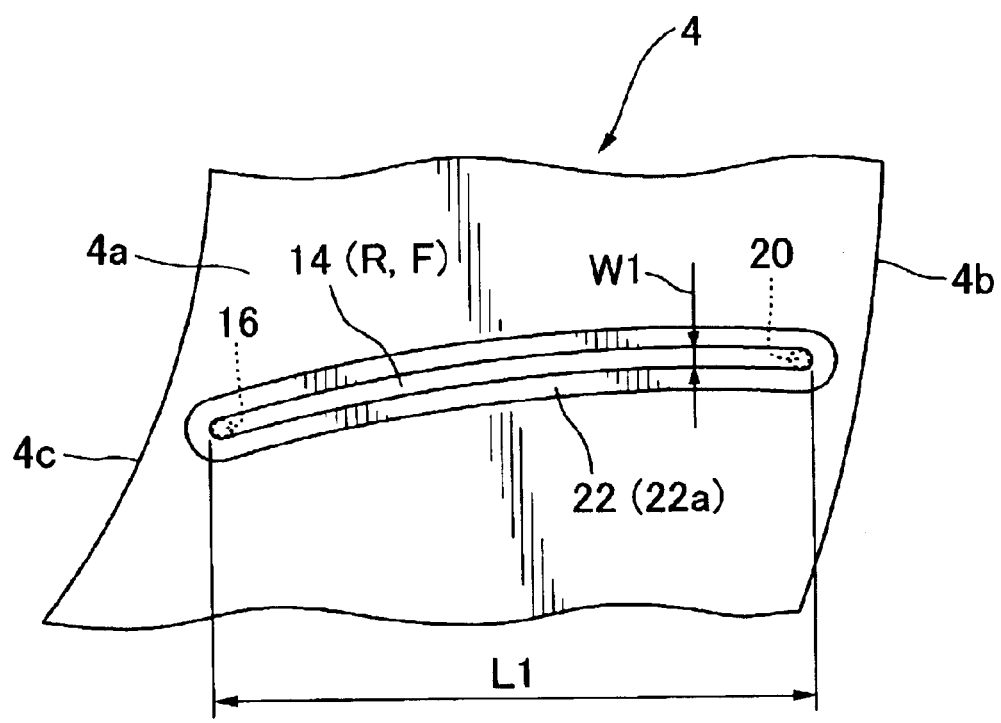
FIG. 5 is an enlarged view of an area designated by the line V—V in FIG. 4.
Figure 6:
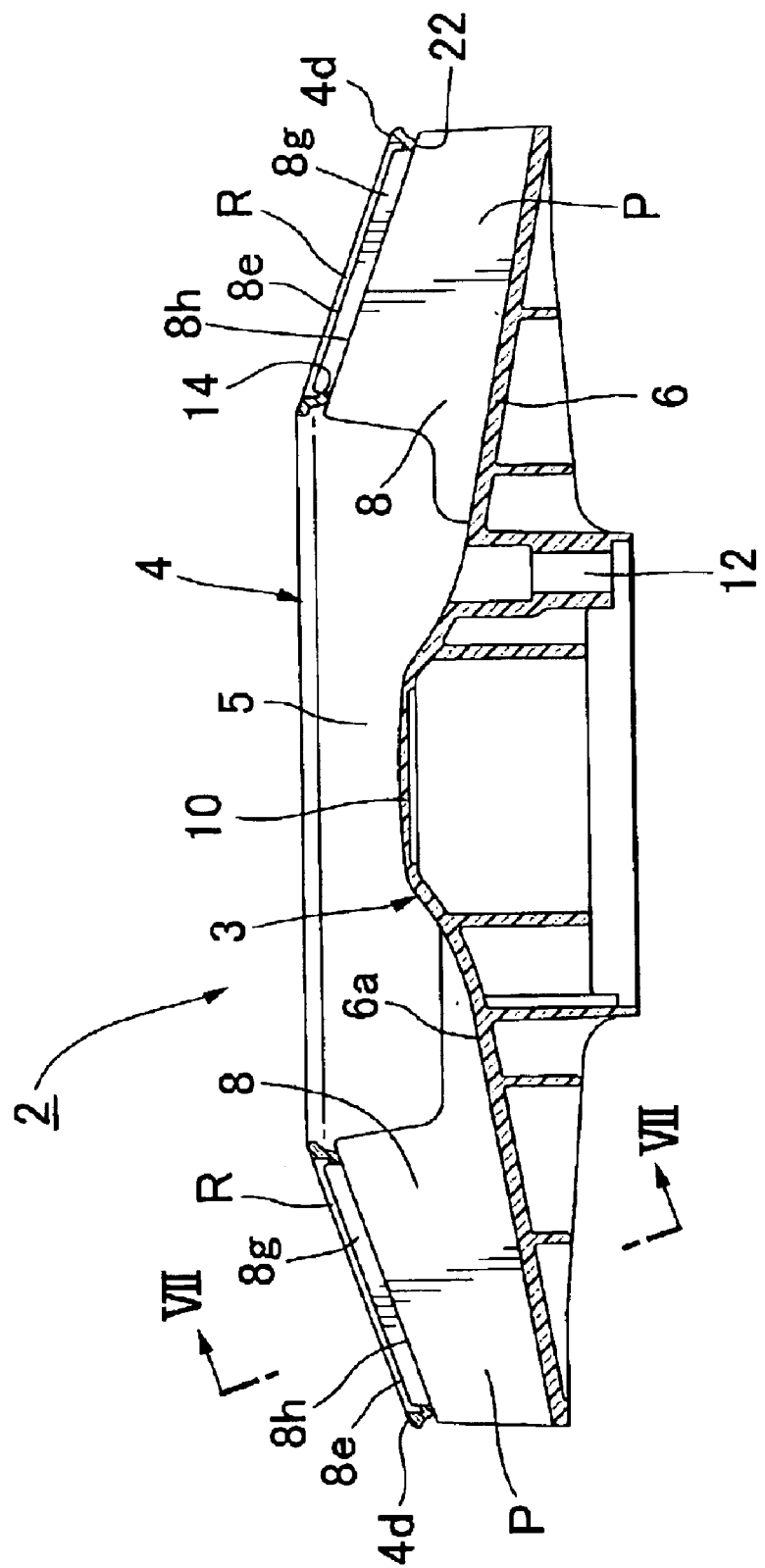
FIG. 6 is a vertical sectional view of the set of split bodies in a state where the first and second split bodies are assembled together.
Figure 7:
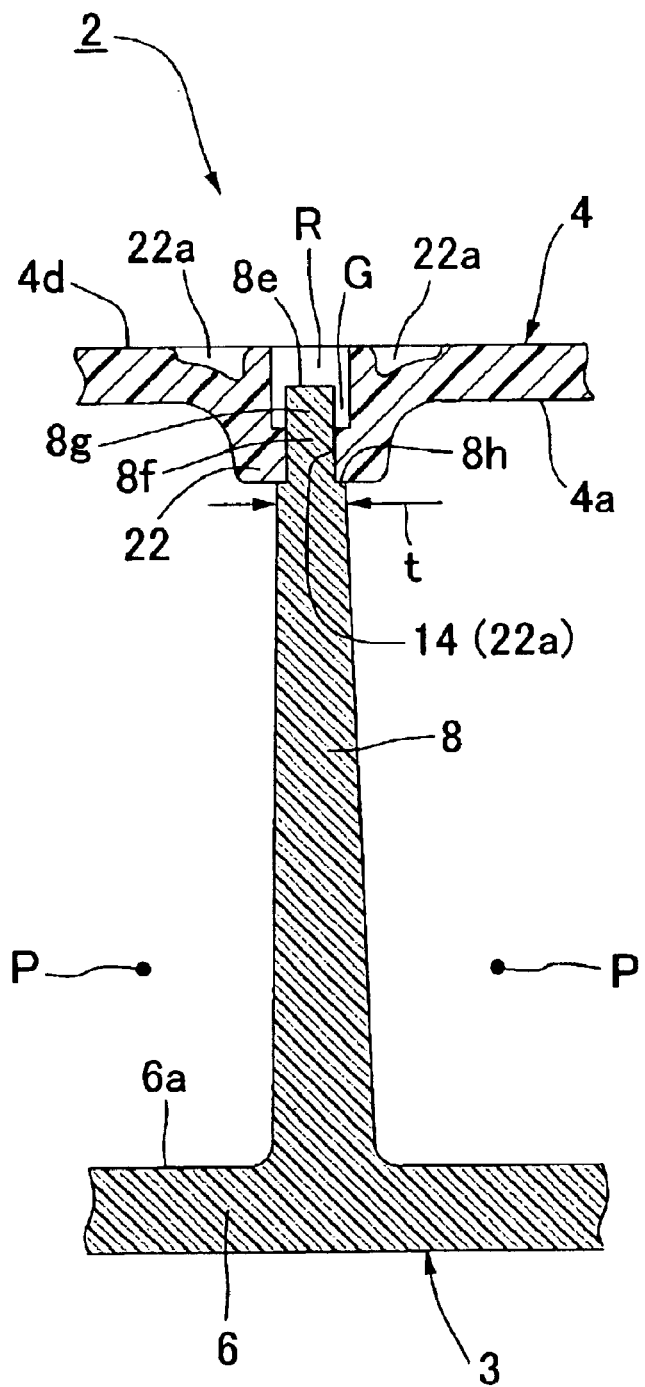
FIG. 7 is a cross-sectional view taken along the line VII—VII in FIG. 6.

FIG. 3 is a front view of the second split body, and FIG. 4 is a rear view of the second split body. FIG. 5 is a fragmentary enlarged view of FIG. 4, and FIG. 6 is a vertical sectional view of the set of split bodies in a state where the first and second split bodies 3, 3 are assembled together. FIG. 7 is a cross-sectional view taken along the line VII–VII in FIG. 6.

The second split body 4 serving as a substantial part of the cover portion as shown in FIGS. 3 and 4 is attached onto the first split body 3 as shown in FIG. 2.

The second split body 4 has an outer diameter D equal to that of the first split body 3. The second split body 4 is formed with the air inlet opening 5 at the center thereof to generally have a doughnut shape. The second split body 4 is made of the same synthetic resin as that of the first split body 3. As seen in FIG. 3, the outer surface of the second split body 4 on the opposite side of the first split body 3 is formed with a plurality of groove-like reservoirs R extending radially in alignment with the corresponding blade members 8 in the assembled position where the first and second split bodies 3, 4 are assembled together (hereinafter referred to as "assembled position").

As shown in FIG. 4, each of the reservoirs R has a bottom wall 22 formed with a through hole adapted to allow the upper portion 8e of the corresponding blade member 8 of the first split body 3 to be inserted therethrough so that the terminal end 8e of the blade member 8 is exposed into the corresponding reservoir R in the assembled position. Each of the through holes 14 extends radially along the corresponding reservoir R extending radially in alignment with the corresponding blade member 8 in the assembled position.

As described in detail later, the first and second split bodies 3, 4 are fusedly jointed together by injecting the molten synthetic resin into the reservoirs R. For obtaining a maximized structural strength in this process, the length of each of the through holes 14 is approximated to that of the corresponding blade member 8 as much as possible to allow the entire blade member 8 to be inserted therethrough. More specifically, it is desirable to form the through hole 14 substantially from the outer edge 4b to the inner edge 4c of the second split body 4 or substantially over the entire width W of the second split body 4. In addition, the upper portion 8f of the blade member 8 is formed with a notch 8c having a length L2 approximately equal to the length L1 of the through hole 14 in conformity with the position of the through hole 14.

Returning to FIG. 2, the configuration of the upper portion of the blade members 8 will be described in more detail. In each of the blade members 8, the notch 8c is formed at each of both ends thereof The portion to be inserted in the corresponding through hole 14 (upper portion 8f) is located between the two notches 8c. A step portion 8h is formed around the lower end of the upper portion 8f (see FIG. 7). That is, the upper portion 8f has a smaller thickness than the thickness t of the lower portion of the blade member 8. The through hole 14 has a complementary shape with the thin upper portion 8f to allow the thin upper portion 8f to be tightly fitted into the through hole 14 when inserted. Thus, the through hole 14 is closed by the upper portion 8f to form the reservoir R for receiving an injected molten synthetic resin as described in detail later. Further, the step portion 8h is adapted to contact a part 22a of the inner surface 4a of the second split body 4 facing to the first split body 3 and surrounding said through hole in said assembled position.

As shown in FIG. 7, in the assembled position, the nose of the thin upper portion 8f serves as a protrusion 8g extending into the reservoir R. Further, the protrusion 8g has a thickness less than the width of the reservoir R to form a certain gap G between the inner wall of the reservoir R and the outer periphery of the protrusion 8g. The protrusion 8g also has a height less than the depth of the reservoir R. As described in detail later, when molten synthetic resin is injected into the reservoir R, it flows in the gap G, and fills the space of the reservoir R above the protrusion 8g.

Referring to FIGS. 4 to 7, the bottom wall 22 of the second split body 4 has a raised portion extending toward the blade member 8 so as to increase the depth of the reservoir R to increase the height of the protrusion 8g of the blade member 8 residing in the reservoir R in the assembled position. As seen in FIG. 7, the cross section of the through hole 14 has a smaller width than that of the reservoir R, and thereby a stepped hole is formed by the reservoir R and the through hole 14.

As shown in FIG. 3, a plurality of recesses 22a are formed in the outer surface 4d of the second split body 4 in conformity of the corresponding raised portions of the bottom walls 22.

The set of split bodies for the blower fan 2 according to this embodiment is molded, assembled and integrally formed as the blower fan 2 in the following process.

The set of split bodies for the blower fun according to this embodiment is molded through the DSI molding process. A molding die comprises, but not shown, a fixed die, a movable die, and a sliding die sandwiched between the fixed and movable dies. The sliding die is slidably moved between upper and lower positions by a cylinder while keeping the sliding die in tight contact with the fixed die. The movable die is moved forward and rearward by an opening/closing mechanism. In the opposed surfaces of the movable and sliding dies, the upper-side surface of the movable die is formed with a female cavity die for the first split body 3, and the upper-side surface of the sliding die is formed with a male die for the first split body 3.

Further, the lower-side surface of the movable die is formed with a male die for the second split body 4, and the lower-side surface of the sliding die is formed with a female cavity die for the second split body 4. The surface of the female cavity die formed in the lower-side surface of the sliding die is formed in the same shape as that of the outer surface 4d of the second split body 4 and has projected portions for forming the reservoirs R. The female cavity die are structured in such a manner that the projected portions can be replaced with portions, each having a surface which is flush with an annular shape portion of the outer surface 4d by well known means in the field of a injection molding. The surface of the male die formed in the lower-side surface of the movable die is formed in the same circular shape as that of the inner surface 4a of the second split body 4 and formed with a plurality of radially extending stepped convex lines for forming the through holes 14 and the reservoirs R (The above dies are not shown).

At the lower position of the sliding die, the sliding and movable dies are matched with each other, and the first and second sprit bodies 3, 4 are primarily molded by injecting molten synthetic resin into the respective cavities. Then, the movable die is moved in the rearward direction causing the movable die to get away from the sliding die, and the sliding die is moved to the upper position by the cylinder while leaving the first and second split bodies in the corresponding female cavity dies to align the second split body 3 with the first split body 4. Further, the projected portions for forming the reservoirs R are replaced with the portions, each having the surface which is flush with the annular shape portion of the outer surface 4d. Then, the movable die is moved toward the sliding die to butt the first split body 3 to the second split body 4. Thus, the upper portion 8f of the each blade members 8 is inserted in the corresponding through hole, and the terminal end 8e and the outer periphery of each of the protrusions 8g are exposed into the corresponding reservoir R. Further, the step portion 8h of each of the blade members 8 contacts the surface 22a surrounding the corresponding through hole 14 to liquid-tightly close the through hole 14. In this position, the respective openings of the reservoirs R are closed by the flush wall of the sliding die for forming the second split body 4 to define the reservoirs R or a flow channel F for receiving and guiding molten synthetic resin to be injected therein.

Returning to FIG. 5, the sliding die for forming the second split body 4 is formed with inlet ports 16 for allowing the molten synthetic resin to be injected into the flow channels F therethrough, and vent holes 20 opened to atmosphere to discharge gas from the dies. Each flow channel F has the inlet port 16 and the vent hole 20 and the respective position thereof are indicated by the dotted lines in FIG. 5. The inlet port 16 is opened at one of the ends of the reservoir R or the flow channel F, and the vent hole 20 is opened at the other end of the reservoir R or the flow channel F.

In the above position, molten synthetic resin of the same material as that of the first and second split bodies 3, 4 is injected into the reservoirs R from an injection machine through the corresponding inlet ports 16 in fluid communication therebetween. Each of the reservoirs R is filled with the molten synthetic resin sequentially from its upstream side or the position of the inlet port 16. The molten synthetic resin flows through the reservoir R to its downstream end. At the same time, the gap G between the protrusion 8g of the upper portion 8f of the blade member 8 and the inner wall of the reservoir R, and the space of the reservoir R above the terminal end 8e of the protrusion 8g are filled with the molten synthetic resin. Air in the reservoir R is pushed out to atmosphere through the gas-vent hole 20 by the molten synthetic resin. The molten synthetic resin contacts the respective wall surfaces defining the reservoirs R, and fuses them as much as required by its heat. Gas caused by the fusion of the synthetic resin of the wall surfaces is also discharged from the gas-vent hole 20 to atmosphere.

When a given amount of the molten synthetic resin is injected to allow the respective reservoirs R to be fully filled therewith, the injection operation is completed.

Then, the integrally formed blower fan 2 is released from the dies. An operator visually checks whether the respective reservoirs R are filled with the synthetic resin to determine that the first and second split bodies 3, 4 are firmly jointed. If only a part of the reservoirs R is filled due to an insufficient injected amount of the molten synthetic resin for some reason, any unacceptable blower fan 2 in the visual checking is eliminated because defective junctions of the blade members cause insufficient structural strength.

In the above embodiment, the respective upper portions 8f of the blade members 8 are tightly fitted in the corresponding through holes 14 in the assembled position. This prevents the leakage of the molten synthetic resin from the reservoirs R caused by injection pressure. In addition, the second split body 4 can be readily positioned with respect to the first split body 3 by inserting the respective upper portions 8f of the blade members 8 into the corresponding through holes 14.

Further, the respective protrusions 8g of the blade members 8 are protruded into the corresponding reservoir in the above embodiment. This provides increased contact area between the protrusions 8g and the molten synthetic resin injected into the reservoirs R, and enhanced connection strength.

Furthermore, the bottom wall 22 has the raised portion in the above embodiment. Thus, the depth of the reservoir R can be increased according to need without restriction from the thickness of the second split body 4. Accordingly, the length of the protrusion 8g can be increased to facilitate increasing the contact area between the protrusion 8g and the molten synthetic resin and achieve more enhanced connection strength. The volume of the reservoir R can also be increased by increasing the depth of the reservoir R. This makes it possible to prevent sharp temperature drop of the injected molten synthetic resin, and reliably fuse the upper portion 8f of the blade member 8 to provide enhanced bonding strength.

In the above embodiment, the respective upper portions of the blade members 8 are approximately entirely inserted into the corresponding reservoirs R to joint them together. This provides strong fusion connection strength.

Further, the respective reservoirs R to be filled with the injected molten synthetic resin are exposed outside in the above embodiment. This facilitates visually determining if the entire blade members 8 are adequately jointed.

Furthermore, the respective blade members 8 are formed integrally with the circular base 6 to be rotatably driven by the driving unit in the above embodiment. Thus, the circular base 6 can assure a required strength against the force applied from the driving unit. On the other hand, the second split body 4 serving as a substantial part of the cover portion to be applied with no large external force is fusedly jointed with the blade members 8. This provides a required strength as the entire blower fan 2.

It is to be understood that the present invention is not limited to the above embodiment, but various modifications can be made without departing from the spirit and scope of the present invention determined only by the appended claims and their legal equivalents. Therefore, it is intended that such modifications be encompassed within the scope of the present invention.

For example, while the above embodiment uses the molten synthetic resin of the same material as that of the first and second split bodies 3, 4, it is not required to use the same material, but any other suitable kinds of material capable of being fusedly jointed with the synthetic resin of the first and second split bodies 3, 4 may be used.

The above embodiment provides the raised portion in the bottom wall of the reservoir R. While the raised portion is advantageous to increase the depth and volume of the reservoir R, the raised portion of the bottom wall 22 is not essential as long as the volume of the reservoir R can be assured to maintain the molten synthetic resin at a given high temperature.

The above embodiment provides the thin protrusion 8g in the upper portion 8f of the blade member 8 to allow the contact area between the upper portion and the molten synthetic resin to be increased. However, only the terminal end 8e of the blade member 8 may be exposed into the reservoir R without providing the protrusion 8g.

Further, the reservoir R may be composed of a plurality of reservoir segments disposed in the longitudinal direction of the blade member in the assembled position.

Furthermore, the position of the inlet port 16 and the gas-vent hole 20 provided in the die for forming the second split body 4 may be disposed any other suitable position in fluid communication with the reservoir R.

As mentioned above, the present invention can provide a set of split bodies capable of facilitating the reliable production of an integral blower fan through the hollow-article injection molding process.

What is claimed is:

1. A set of split bodies for forming a synthetic-resin blower fan through a hollow-article injection molding process, said blower fan integrally including a circular base, a doughnut-shaped cover portion having an air inlet opening at the center thereof, and a plurality of blades each extending radially between said circular base and the inner surface of said cover portion to define a plurality of radial airflow passages between said adjacent blades, said set of split bodies comprising:

a first split body including said circular base and a plurality of blade members serving as respective substantial parts of said blades; and a second split body defining said inner surface of said cover portion and having an outer surface on the opposite side of said first split body, wherein said outer surface of said second split body is formed with a plurality of reservoirs each extending radially in alignment with the corresponding blade member of said first split body to define spaces to be filled with molten synthetic resin in a state where said first and second split bodies are assembled together, each of said reservoirs having a bottom wall formed with a through hole adapted to allow an upper portion of said blade member to be inserted therethrough and tightly fitted therein so that the terminal end of said blade member is exposed into the corresponding reservoir in said assembled position, while being closed by a die having a surface flush with said outer surface of said second split body and having an inlet port for injecting the molten synthetic resin and a vent hole, said reservoir being fully filled with said molten synthetic resin by injection through said inlet port.

2. The set of split bodies as defined in claim 1, wherein said upper portion of said blade member is provided with a protrusion adapted to extend into said reservoir with a certain gap formed between the outer peripheral surface of said protrusion and the inner peripheral surface of said reservoir in said assembled position.

3. The set of split bodies as defined in claim 2, wherein said bottom wall has a raised portion extending from said inner surface toward said blade member so as to increase the depth of said reservoir to allow to increase the height of said protrusion to be adapted into said reservoir in said assembled position.

4. The set of split bodies as defined in claim 1, wherein said upper portion of said blade member includes a step portion around the lower end thereof, said step portion extending in the thickness direction of said blade member, said step portion being adapted to contact a part of said inner surface of said second split body surrounding said through hole in said assembled position.

5. The set of split bodies as defined in claim 2, wherein said upper portion of said blade member includes a step portion around the lower end thereof, said step portion extending in the thickness direction of said blade member, said step portion being adapted to contact a part of said inner surface of said second split body surrounding said through hole in said assembled position.

6. The set of split bodies as defined in claim 3, wherein said upper portion of said blade member includes a step portion around the lower end thereof, said step portion extending in the thickness direction of said blade member, said step portion being adapted to contact a part of said inner surface of said second split body surrounding said through hole in said assembled position.

* * * * *